Nov. 28, 1967

T. BUDZICH 3,354,978

SPEED RESPONSIVE HYDROSTATIC DEVICE

Filed July 12, 1965

INVENTOR
TADEUSZ BUDZICH
By William N. Hogg
Attorney

Nov. 28, 1967  T. BUDZICH  3,354,978
SPEED RESPONSIVE HYDROSTATIC DEVICE
Filed July 12, 1965  3 Sheets-Sheet 2

INVENTOR
TADEUSZ BUDZICH
By William N. Hogg
Attorney

Nov. 28, 1967 T. BUDZICH 3,354,978
SPEED RESPONSIVE HYDROSTATIC DEVICE
Filed July 12, 1965 3 Sheets-Sheet 3

FIG. 5

INVENTOR
TADEUSZ BUDZICH
By William N. Hogg
Attorney

United States Patent Office 3,354,978
Patented Nov. 28, 1967

3,354,978
SPEED RESPONSIVE HYDROSTATIC DEVICE
Tadeusz Budzich, 80 Murwood Drive,
Moreland Hills, Ohio
Filed July 12, 1965, Ser. No. 471,094
47 Claims. (Cl. 180—44)

This is a continuation-in-part of application Ser. No. 396,047 filed Sept. 14, 1964, entitled Hydrostatic Mechanisms.

This invention relates generally to fluid motors and to power drives of self-propelled vehicles and more particularly to motors and hydrostatic drives for the front wheels of tractors, self-propelled farm machinery, earth moving equipment and the like.

In still more particular aspects this invention relates to variable displacement fluid motors and to synchronization controls of fluid front axle drives, using such variable flow motors and an automatic pressure responsive variable pump control.

A front axle fluid power drive, utilizing fluid motors supplied by a variable displacement pump, controlled by automatic pressure responsive control, which varies the pump displacement to maintain a constant system pressure, will develop a constant torque at the fluid motors. The fluid motors of such a drive, which are normally pivotally mounted on the steered wheels and drivingly engaged therewith, will automatically synchronize their driving effort with the mechanical transmission, which supplies power to the rear wheels.

Most prior art front axle synchronizing fluid drives of this type have utilized a variable flow pump and fixed displacement motors. In such a transmission circuit when the front wheel drive is disengaged clutches must be provided between fluid motors and the wheels to prevent excessive circulation losses of the fluid within the fluid motors themselves. Also with this prior art type of drive at higher driving speeds, when the flow demand of the fluid motors exceeds the maximum capacity of the variable flow pump, the fluid drive will automatically stop transmitting power and torque to the front wheels. Further, under the unloaded conditions the fluid is circulated through the transmission lines at a very high rate, and therefore, high circulation losses will take place with the associated high rate of parasitic heat generation. To extend the useful speed range of the hydrostatic drive using fixed displacement motors, either excessively large variable flow pumps must be used or the size of the fluid motors reduced. Neither of these alternatives provides an ideal solution. A large pump is not only expensive but it would perform most of its work in a low range of its output, where its efficiency is low. Furthermore, this excessive pump capacity is used only at high speeds where the power requirements of some types of vehicles are quite low. However, even if a pump of sufficient capacity is provided to cover the full speed range of the vehicle, the above fluid drive, because of its basic characteristics, would still have the following disadvantage. Since such a drive develops constant torque at the fluid motors, the horsepower output of this drive would then be directly proportional to the vehicle surface speed. This is a very undesirable characteristic in drive applications for farm machinery, earth moving equipment, industrial tractors and the like. In these vehicles the higher driving speeds are utilized for transport purposes, where the vehicle is not performing any additional work and where the power requirements are comparatively low.

The alternative step of reduction of the size of the fixed displacement motor, to extend the useful operating range of the transmission, carries the obvious disadvantage of reduced effectiveness of the drive under conditions of high torque demand.

In some applications of an auxiliary hydrostatic drive, the reversing feature of the drive becomes a necessity. With fixed displacement motors flow reversing devices such as conventional four way valves must be used. In these reversing applications both of the motor ports must be capable of accepting high pressure fluid, thus necessitating expensive high pressure flexible lines leading to both motor ports. In some other applications of auxiliary hydrostatic drives the free differential feature of those drives may be a disadvantage. Loss of traction at one wheel will automatically unload the transmission circuit interrupting the operation of the drive.

It is therefore a principle object of this invention to provide a synchronized fluid drive which will permit transmission of power, from a variable flow pump to variable fluid motors, throughout the entire range of vehicle surface speeds, permitting the drive to effectively work at speeds higher than those possible with fixed motors.

Another object of this invention is to provide a fluid power synchronizing drive utilizing a variable pump automatically controlled in respect to system pressure and independently variable fluid motors, the displacement and therefore torque output of those motors being varied inversely in respect to the vehicle speed.

Still another object of this invention is to provide a fluid power synchronizing drive utilizing a pressure responsive automatically controlled variable displacement pump and which drive includes independently variable fluid motors, with the displacement and therefore the torque output of said motors being automatically controlled inversely with respect to fluid flow supplied to said motors.

Still another object of this invention is to provide a fluid power synchronizing drive utilizing independently automatically controlled variable displacement motors to limit the differential action of the drive and prevent interruption in circulating power when traction at one of the wheels of a vehicle powered by said drive is lost.

Still another object of this invention is to provide a fluid power synchronizing drive in which there is minimum circulation losses, such minimum losses being achieved without the use of clutches between the fluid motors and driving wheels.

A further more specific object of this invention is to provide a fluid power synchronizing drive in which the motors have a variable displacement and the displacement is automatically brought to zero when the variable pump is unloaded, thus eliminating the necessity of clutches between the fluid motors and driving wheels.

Yet another object of this invention is to provide a fluid power synchronizing drive which will permit the reversal of direction of the drive without use of flow reversing controls.

An additional object of this invention is to provide a fluid power synchronizing drive in which reversed direction of rotation of the fluid motors is accomplished within the fluid motor itself without reversing the polarity of the motor ports.

Still a further more particular object of this invention is to provide a fluid power synchronizing drive in which the reversal of direction of rotation of the fluid motors is accomplished within the motor, therefore requiring only one high pressure fluid line.

Still an additional object of this invention is to provide, in a fluid power synchronizing drive, fluid motors which will vary their displacement and therefore their torque output automatically in respect to the ground speed of the vehicle, thus extending useful operational range of the drive into high surface speeds of the vehicle.

Yet another more general object of this invention is to provide improved variable fluid motors.

Yet a further object of this invention is to provide a variable fluid motor which will vary its displacement in respect to speed of rotation of the output shaft.

A still further object of this invention is to provide a variable fluid motor which wil lautomatically adjust its displacement with change in the fluid flow supplied to the motor.

Still another object of this invention is to provide a variable fluid motor which will automatically adjust its torque and speed output in response to a change in flow output of a supply pump.

Still an additional object of this invention is to provide a variable fluid motor equipped with automatic control to vary the motor torque and speed output in respect to change in motor speed in the zones of its forward rotation, the change of direction of rotation of the motor being accomplished within the displacement changing mechanism without changing the polarity of the motor ports.

Further objects and advantages of this invention will become apparent from the following description and drawings in which.

Although the invention has broader appilcations, it will be described hereinafter in specific relation to a tractor, which presently constitutes the preferred use.

Figure 1:
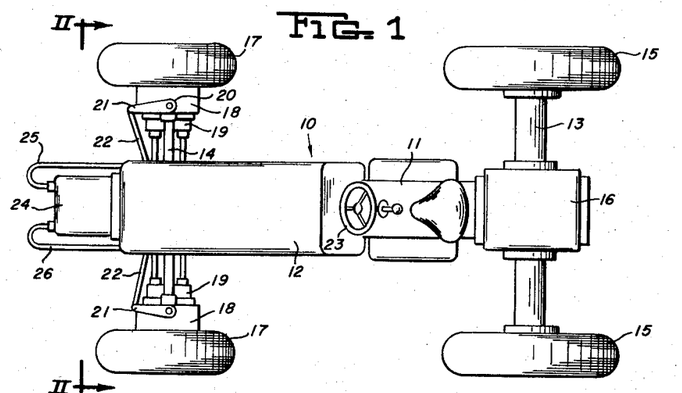
FIGURE 1 is a plan view somewhat schematic of a tractor showing the mounting of fluid motors and a representative mounting of a fluid pump according to this invention.

Referring now to the drawings and for the present to FIG. 1, a tractor generally designated as 10 is shown having a frame 11 mounting an engine 12, a back axle 13 and a front axle 14. Rear wheel 15 are mounted on back axle 13 and are drivingly connected with the engine 12 by a conventional mechanical transmission 16. Steered front wheels 17 are provided and each is equipped with a mechanical gear reducer 18 mounting a fluid motor 19. The combination of the front steered wheels 17, gear reducers 18 and fluid motors 19 are pivotally mounted by king pins 20 in respect to front axle 14. A conventional steering arm 21, through a tie rod 22, connects the front steered wheels 17 to a tractor steering wheel 23. A variable flow pump, generally designated as 24, is driven by the engine 12 and is connected through flexible ducts 25 and 26 to the fluid motors 19. As shown in FIG. 1, the variable flow pump 24 is directly mounted on the engine although it can be mounted at any suitable power take-off position.

Figure 2:
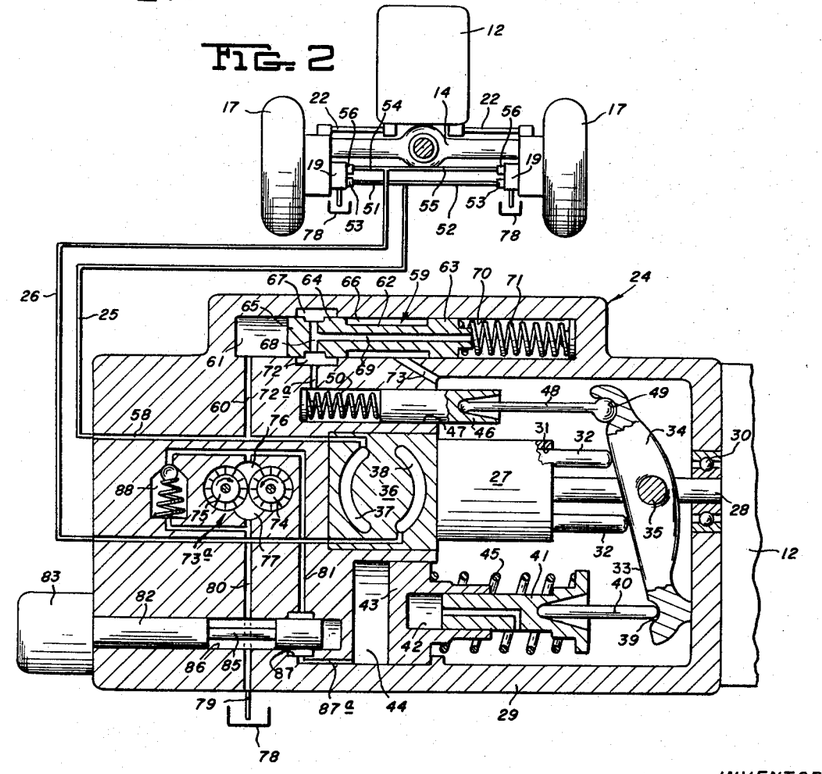
FIG. 2 is a somewhat schematic representation of the fluid drive components of this invention with variable displacement pump and pump control components shown somewhat diagrammatically.

Referring now to FIG. 2, the variable flow pump 24 is shown with its working components and controls diagrammatically disposed. The pump 24 includes a pump housing 29 in which a cylinder barrel 27 is rotatably mounted. The rotary motion from the engine 12 is transmitted to the cylinder barrel 27 by a shaft 28, journalled in the pump housing 29 by a bearing 30. The cylinder barrel 27 is provided with cylinder bores 31 reciprocably guiding pistons 32, which pistons abut reaction surface 33 of a trunnion 34. The trunnion 34 is mounted for limited rotation in respect to pump housing 29 by a trunnion pin 35. The cylinder barrel 27 abuts valve plate 36 (diagrammatically shown rotated 90° for clarity of explanation), which valve plate has a high pressure kidney shaped timing port 37 and a low pressure kidney shaped timing port 38.

The trunnion 34 has an internal part-spherical surface 39 engaging a first push rod 40, which push rod engages a spring guide 41. The spring guide 41 is slidably disposed in an axial bore 42 formed in an unloading piston 43. The unloading piston 43 is slidably mounted in an unloading bore 44 formed in the housing 29. A control spring 45 is interposed between the spring guide 41 and unloading piston 43 and through push rod 40 biases the trunnion 34 toward the position of its maximum angular inclination and thus maximum pump output.

A control piston 46 is provided which is guided in a control bore 47 formed in the pump housing 29. The control piston 46 engages a second push rod 48 which in turn engages a second internal spherical surface 49 formed in the pump trunnion 34. The control bore 47 contains a reaction spring 50 normally biasing the control piston 46 and push rod 48 toward engagement with trunnion 34.

The high pressure timing port 37 and low pressure timing port 38, of the variable pump 24, are connected through flexible ducts 25 and 26 to fluid motors 19. The high pressure timing port 37 is connected through flexible duct 25 and ducts 51 and 52 to motor ports 53 and the low pressure timing port 38 through flexible ducts 26 and ducts 54 and 55 is connected with motor ports 56.

A passage 58 is provided in the housing 29 which conducts pressure fluid from the high pressure timing port 37 to passage 60 which communicates with bore 61 of automatic pressure responsive pump control 59. The bore 61 of the pump control 59 slidably guides a control spool 62. The control spool is equipped with lands 63, 64 and 65, defining therebetween annular spaces 66 and 67 respectively. Annular space 67 is connected through cross passage 68 and longitudinal passage 69 with space 70 at the remote end of bore 61. A valve spring 71 is interposed between control spool 62 and the housing of automatic pressure responsive pump control 59. The bore 61 is interrupted by annular ring 72, which through passage 72a formed in the housing 29 communicates with the control bore 47. Annular space 66 communicates through passage 73 with a low pressure zone of the pump, within its interior.

A fixed displacement gear pump, generally designated as 73a is provided which has a driving gear 74 and driven gear 75. The driving gear 74 is drivingly connected to the shaft 28. The gear pump 73a has an outlet port 76 and an inlet port 77. The inlet port 77 is connected to diagrammatically shown reservoir 78 by line 79 and passage 80. The outlet port 76 communicates through passage 81 and 87a with the unloading bore 44. An unloading valve spool 82, operated by solenoid 83 is provided and has a reduced diameter control portion 85. The unloading spool 82 is slidably guided in bore 86, provided with a circumscribing annular ring 87, which communicates with the unloading bore 44 through passage 87a. A conventional relief valve 88 functionally interconnects passages 81 and 80 and therefore high and low pressure ports 76 and 77 of gear pump 73a.

Figures 3, 3A:
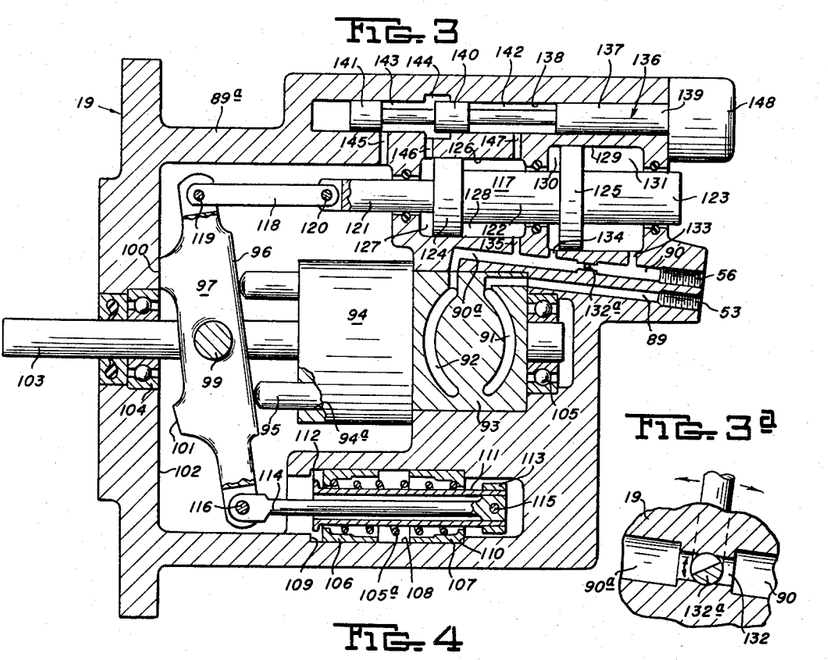
FIG. 3 is a sectional view of one embodiment of a variable displacement fluid motor of this invention.
FIG. 3A is a detailed view of a variable fluid flow restricting device for use in the motors of this invention.

Referring now to FIG. 3, one of the fluid motors 19 is shown with some of its working components diagrammatically disposed. The motor 19 includes a housing 89a which is provided with the motor ports 53 and 56; the ports 53 and 56, respectively, are connected through passages 89 and 90, respectively, with timing ports 91 and 92 of valve plate 93 (which is diagrammatically shown rotated 90° for clarity of explanation). A cylinder barrel 94, rotatably mounted in the housing 89a, abuts the valve plate 93 and slidably guides pistons 95 in piston bores 94a. The ends of the pistons 95 abut reaction surface 96 of a motor trunnion 97. The motor trunnion 97 is mounted for limited rotation, in respect to motor housing 89a, by trunnion pins 99. Motor trunnion stops 100 and 101 are provided which in combination with surface 102 of the housing 89a limit the angular travel of the motor trunnion 97. The stop 101 limits the maximum angle of inclination of the motor trunnion 97, in one direction, while stop 100 limits the maximum angle of inclination of the motor trunnion in opposite direction. The cylinder barrel 94 is drivingly connected to a motor shaft 103, which is journalled in respect to the housing 98 by bearings 104 and 105.

A spring 105a is located within spring guides 106 and 107 which are slidably guided in bore 108. This constitutes a spring assembly. The bore 108 terminates in stops 109 and 110, which limit travel of the spring guides 106 and 107. The spring guides 106 and 107 slidably guide spring tube 111, equipped with stops 112 and 113. A connecting rod 114 is located within spring tube 111, engaging it with limited freedom of rotation through pin 115. The connecting rod 114 is connected to the motor trunnion 97 by pin 116. A reaction piston generally designated as 117 is provided and is connected by connecting rod 118 and pins 119 and 120 to the motor trunnion 97.

The reaction piston 117 has a first stem section 121, a second stem section 122, a third stem section 123, a first head section 124 and a second head section 125. The first head section 124 functionally divides bore 126 into spaces 127 and 128, and the second head section 125 functionally divides bore 129 into spaces 130 and 131. A restriction orifice 132 is provided which connects the passages 90 and 90a. Passage 90 on one side of restriction orifice 132 is connected by passage 133 to space 131, and passage 90a on the other side of restriction orifice 132 is connected by passage 134 to space 130 and by passage 135 to space 128.

A reversing valve generally designated as 136 is provided and includes a spool 137, slidably guided in a valve bore 138. The spool 137 has lands 139, 140 and 141 defining annular spaces 142 and 143. The valve bore 138 has a circumscribing annular ring 144. The space 143 is connected by passage 145 with low pressure zone within the motor. The annular ring 144 is connected through passage 146 to space 127. The space 142 is connected through passage 147 with space 128. The spool 137 is selectively operable by a solenoid 148.

FIG. 3A shows a restriction orifice having a restriction plug 132a which when rotated by the handle (unnumbered) will change the resistance characteristic of the orifice.

Figure 4:
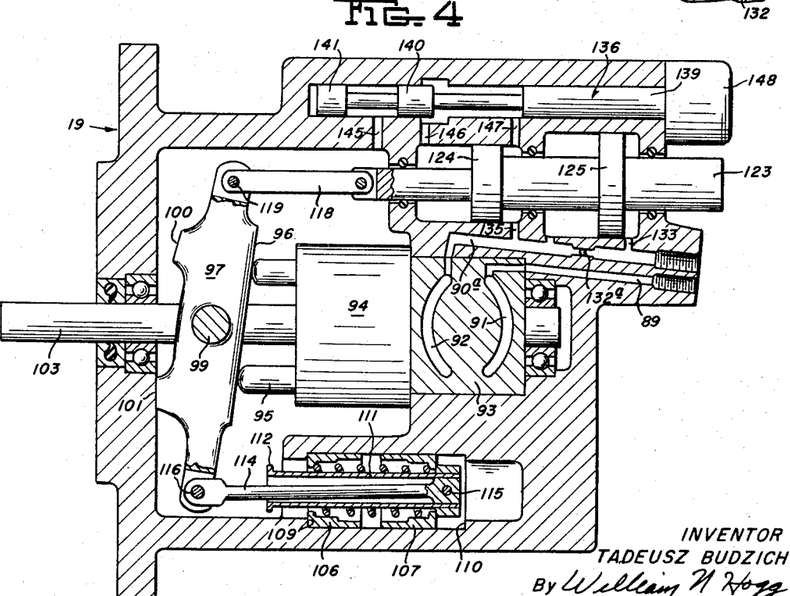
FIG. 4 is a sectional view of the embodiment of a variable displacement fluid motor of FIG. 3 but working in a reverse direction of rotation.

Referring now to FIG. 4 the motor of identical construction of FIG. 3 is shown with its trunnion 97 rotated to position equivalent to reverse rotation.

Figure 5:
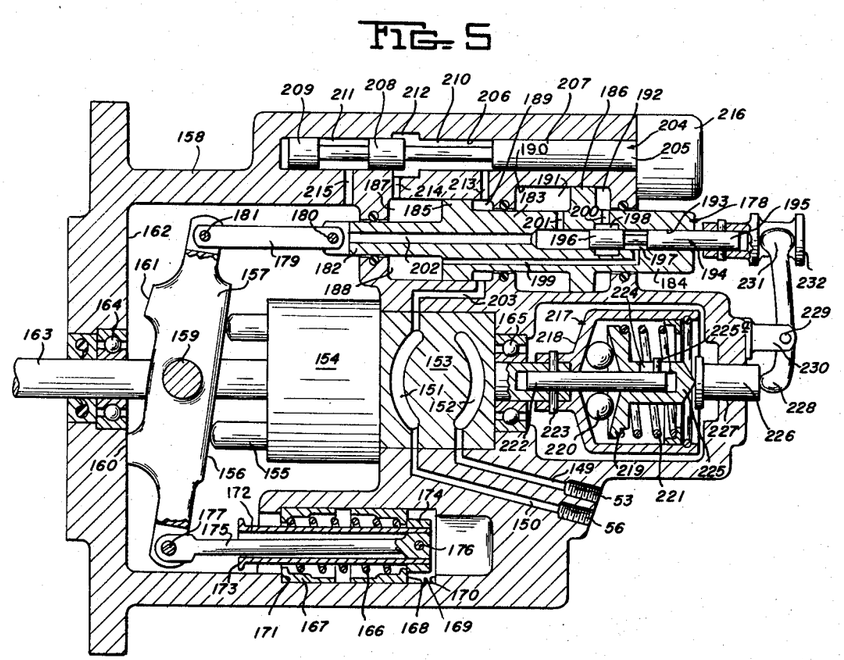
FIG. 5 is a sectional view of another embodiment of a variable displacement fluid motor of this invention.

Referring now to FIG. 5 another embodiment of a fluid motor is shown with some of its working components diagrammatically disposed. The high pressure inlet port 53 and low pressure outlet port 56 are connected respectively through passages 149 and 150 with timing ports 151 and 152, of valve plate 153 (which is diagrammatically shown rotated 90° for clarity of explanation). A cylinder barrel 154 is rotatably mounted in housing 158 and abuts valve plate 153. Pistons 155 are slidably guided in piston bores (not shown) in the cylinder barrel. The pistons 155 have part spherical ends which engage reaction surface 156 of a motor trunnion 157. The motor trunnion 157 is mounted for limited rotation in respect to the housing 158 by trunnion pins 159. Trunnion stops 160 and 161 provided on the trunnion 157, in combination with end surface 162, of the housing 158, limit the maximum angle of inclination of motor trunnion 157 on each side of center. The cylinder barrel 154 is drivingly connected to an output shaft 163, which is journalled in respect to the motor housing 158 by bearings 164 and 165. A biasing spring 166 is contained between spring guides 167 and 168 which guides are slidably mounted in a bore 169. The spring and guides in the bore constitute a spring assembly. The bore 169 terminates in shoulders or stops 170 and 171 which limit travel of spring guides 168 and 167. The spring guides 168 and 167 slidably guide a spring tube 172, having flanges or stops 173 and 174. A connecting rod 175 is positioned within the spring tube 172, engaging it with limited freedom of rotation through pin 176. The connecting rod 175 is connected to the motor trunnion 157 by pin 177.

A reaction piston generally designated as 178 is provided and is connected by connecting rod 179 and pins 180 and 181 to the motor trunnion 157. The reaction piston 178 has a first stem section 182, a second stem section 183, a third stem section 184, a first head section 185 and a second head section 186. The first head section 185 functionally divides bore 187 into spaces 188 and 189. The second head section 186 functionally divides bore 190 into spaces 191 and 192. The reaction piston 178 has an axially extending valve bore 193, in which a pilot valve spool 194 is slidably mounted. The pilot valve spool 194 has lands 195 and 196 defining therebetween an annular space 197. An annular ring 198 circumscribes the pilot valve bore 193. The annular space 197 is connected through passage 199 with space 188. The annular ring 198 is connected through passage 200 to space 192. The pilot valve bore 193 is connected through passage 201 with space 191 and through passage 202 with the space enclosed inside of the motor housing. The space 189 communicates through passage 203 with low pressure motor timing port 151.

A reversing valve generally designated at 204 is provided and includes a spool 205 slidably guided in a bore 206. The spool 205 has lands 207, 208 and 209 defining therebetween annular spaces 210 and 211. An annular ring 212 circumscribes the valve bore 206. The annular space 210 is connected through a passage 213 to space 189. The annular ring 212 is connected through a passage 214 to space 188 and annular space 211 is connected through passage 215 to the space enclosed by the motor housing 158. The spool 205 is selectively operable by a solenoid 216. A governor type speed sensing device, generally designated as 217, is drivingly mounted on the motor shaft 163. The speed sensing device 217 has a reaction housing 218 and an inclined sliding plate 219. A multiplicity of balls 220 are contained between the inclined surfaces of reaction housing 218 and inclined sliding plate 219. A spring 221 is interposed between reaction housing 218 and inclined sliding plate 219. A guiding pin 222, keyed to the end of the motor shaft 163 by pin 223, slidably guides the inclined sliding plate 219. The inclined sliding plate 219 is provided with a slot 224 engaging anti-rotation pin 225a retained in guiding pin 222. The inclined sliding plate 219 with its stem section 225 engages a plunger 226 slidably guided in bore 227 provided in the motor housing 158. The plunger 226 engages a link 228 rotatably mounted by a pin 229 and a bracket 230 to motor housing 158. The link 228 with its curved end 231 engages head 232 secured to pilot valve spool 194.

With respect to the operation of the apparatus hereinabove described, and particularly with reference to FIG. 2, rotary motion from the engine 12 is transmitted by the shaft 28 to the cylinder barrel 27 and causes the pistons 32 to reciprocate as they follow the inclined reaction surface 33 of trunnion 34. This reciprocating motion will induce a pumping action within the cylinder barrel 27. The fluid, in a well known manner, is phased by the high pressure timing port 37 and low pressure timing port 38 of the valve plate 36. The magnitude of the pressure flow, generated within the cylinder barrel 27, is proportional to the angle of inclination of the reaction surface 33 of trunnion 34, in respect to the axis of rotation of the shaft 28. With the reaction surface 33 perpendicular to the axis of rotation of the pump, the pump flow becomes zero; with a maximum angle of inclination, as shown in FIG. 2, the pump volume output becomes maximum. Control of fluid flow is accomplished by changing the angle of inclination of the trunion 34, the angle being regulated by the action of the control spring 45, control piston 46, and automatic pressure responsive pump control 59. The control spring 45, acting through the spring guide 41 and push rod 40, biases the trunnion 34 toward the maximum pump flow position. A pressure signal, supplied from automatic pressure responsive control 59, transmitted through passage 72a to control bore 47, will react on the cross-sectional area of control piston 46, applying force thereto. This force, transmitted to trunnion 34, by push rod 48, will act in opposition to the bias of the control spring 45 (which is maintained in a preloaded position by unloading piston 43) and rotate the trunnion 34 around trunnion pin 35 toward the position of zero pump displacement. The automatic pressure responsive control 59 is arranged to supply a modulated control signal, which will vary the angle of inclination of trunnion 34 and therefore volume output of the pump, to maintain a relatively constant high pressure at port 37. The modulation of the automatic pressure responsive control 59 is accomplished in the following way: Relatively high pressure fluid, conducted from the high pressure timing port 37, through passages 58 and 60 reacts on cross-section area of control spool 62, urging it from left to right (as viewed in FIG. 2) against the biasing force of the valve spring 71. At a given pressure level, as determined by the preload in the valve spring 71, the control spool 62 will move from left to right, connecting annular space 67 with the high pressure fluid. The rising pressure in the annular space 67, transmitted through passages 68 and 69 to space 70, will react on the cross-section area of the control spool 62, supplementing the biasing force of valve spring 71 and moving the control spool 62 from right to left (as seen in FIG. 2) effectively isolating annular space 67 from the high pressure fluid. In this way, under influence of the above forces, the control spool 62 will continuously seek a condition of floating equilibrium, maintaining a pressure level in the annular ring 72 and space 70, proportional to fluid pressure in timing port 37 above pressure level set by the preload in the valve spring 71. A rise in the fluid pressure in the high pressure timing port 37, above the level equivalent to preload in the valve spring 71, will move the control spool 62 effectively raising the pressure in annular ring 72. A drop in the fluid pressure below the level equivalent to preload in the valve spring 71 will connect annular ring 72 with annular space 66 and through passage 73, to low pressure zone, contained within the pump housing 29. A change in the pressure in the annular ring 72, modulated by the automatic pressure responsive pump control 59, will be transmitted to passage 72a and therefore to the control bore 47. This modulated pressure signal, reacting on the cross-section area of the control piston 46, working in conjunction with biasing force of control spring 45, will regulate the angular inclination of trunnion 34 and therefore the volume flow of the pump, to maintain a relatively constant fluid pressure in the high pressure timing port 37. It should be noted that the springs 45 and 50 will inherently vary the biasing force applied to the trunnion, depending upon the angle of the trunnion. The amount of variation is dependent upon the spring rate of the two springs, which is an inherent characteristic of any spring as is well known in the art. Due to the effect of the combined spring rates a higher pressure will be needed to move the trunnion in when it is at a minimum angle than when it is at a maximum angle, and hence the pressure discharge at the minimum and maximum angle will vary in an amount depending upon the combined spring rates. This difference is dictated by design characteristics and may not be negligible. Thus the terms "constant pressure" and "relatively constant pressure" are used herein as they are used in the art to include this inherent pressure variation between minimum and maximum trunnion angle due to the effect of spring rates. The fluid, at relatively constant pressure, is conducted from high pressure timing port 37, through the flexible duct 25, to motor ports 53. The high pressure fluid, after performing work in motors 19, is returned at lower pressure level, through flexible duct 26 to low pressure timing port 38, of the variable pump 24.

The pump 24 can be unloaded by actuating solenoid 83 which will move the spool 82 to the right as seen in FIG. 2. This will connect bore 44 with the reservoir 78. This will unload the piston 43 and under the action of spring 50 and the control spring 45 the trunnion will be moved to a position normal to the axis of rotation of the pump.

Referring now to FIG. 3, assume that the high pressure fluid from pump is supplied to motor port 53. The high pressure fluid will then be conducted through passage 89 to the high pressure timing port 91 of motor 19 and from there, in a well known manner, the high pressure fluid is phased into the cylinder bores of the cylinder barrel 94. The forces, generated within the cylinder barrel 94, reacting against pistons 95 and transmitted to the inclined reaction surface 96, will be transmitted to the motor shaft 103, thus inducing rotary motion. The high pressure fluid, within the cylinder barrel 94, after performing work will be phased into the motor's low pressure timing port 92 and conducted from there, by passage 90a, restrictor orifice 132 and passage 90 to the low pressure motor port 56. Assuming a constant pressure in the high pressure motor timing port 91 and a constant maximum angle of inclination of the motor trunnion 97, as shown in FIG. 3, the motor 19 will develop a constant torque at its shaft 103. Since the variable flow pump is equipped with a control as previously described which will maintain a constant pressure at the motor inlet port 53, the motor 19 will develop a constant torque, as long as the motor trunnion 97 remains at any constant specific angle of inclination. Assuming that a constant flow of pressure fluid, at constant pressure, is supplied to the motor port 56, a change in angle of inclination of the motor trunnion 97 will change both the torque output and the speed of rotation of the motor shaft 103. An increase in angle of inclination, of the motor trunnion 97, will proportionally increase the motor torque output and proportionally decrease the motor output speed. Conversely a decrease in the trunnion angle will proportionally decrease the motor torque output and increase the motor speed; and, when the motor trunnion is in a position perpendicular to the axis of rotation of the shaft 103 the motor output torque will become zero. Under these conditions the device becomes inoperative as a motor, since at a constant flow input to the motor port 53, the motor shaft 103 would have to reach an infinite speed. Therefore when moving motor into the zone of operation where the trunnion angles are small, the limit of proportionally between the torque and speed of hydraulic motors is lost. It can be stated, in general, that under conditions of constant pressure and constant flow at motor port 53 and therefore under the condition of constant horsepower input into the motor, the horsepower output at the motor shaft 103 will remain substantially constant although the change in angle of inclination of the trunnion will vary the relationship between torque and speed, available at the motor output shaft 103.

A clockwise rotation of the trunnion 97, from position as shown in FIG. 3, past the point where the surface 96 is perpendicular to the axis of rotation of motor shaft 103, will reverse direction of rotation of the shaft 103, while the polarity of the timing ports 91 and 92 remains the same. In this way, during a complete arc of rotation of trunnion 97, as defined by trunnion stops 100 and 101, and assuming a constant flow at constant pressure into the motor ports the speed of rotation of the motor shaft 103 will theoretically change from minimum in one direction to infinite and to minimum in the opposite direction while the torque output of the motor will change from maximum in one direction through zero to maximum in the opposite direction. Since, under above described conditions, the motor is a constant horsepower output device, the product of the motor speed output and the torque output will remain constant in all angular positions of the trunnion 97. The perpendicular position of the surface 96 of trunnion 97 in respect to axis of rotation of shaft 103 is then a transition point defining zones of clockwise and anticlockwise operation of the motor. In actual practice because of the friction aspects of the motor mechanism as explained above the full arc of rotation of trunnion 96 will be equivalent to change in the motor speed from minimum in one direction to maximum in that direction then to zero then to a maximum in opposite direction to minimum in said opposite direction.

The motor spring 105a is shown in FIG. 3 in a compressed position thus transmitting, through connecting rod 114, a clockwise turning moment to trunnion 97. In absence of additional turning moments transmitted to trunnion 97 from reaction piston 117 the motor spring 105a will expand from position as shown in FIG. 3 bringing the spring guide 106 in contact with the stop 109, the spring guide 107 remaining in contact with stop 110. Since the stop 112 of spring tube 111 remains engaged with the spring guide 106 and, since spring tube 111 is mechanically connected by pin 115 to the connecting rod 114, expansion of the motor spring 105a will result in clockwise rotation of motor trunnion 97 to a position where the reaction surface 96 becomes perpendicular to the axis of rotation of motor shaft 103, with motor displacement becoming zero. This is the equilibrium position of the motor spring assembly. From this position clockwise rotation of motor trunnion 97 will start compressing motor spring 105a until trunnion stop 101 reaches the surface 102 at which point the motor will reach its maximum displacement position in the zone of its reverse rotation. Therefore in absence of turning moments on trunnion 97 the motor spring 105a will maintain the trunnion 97 in a position equivalent to zero motor displacement at a force level equal to the preload in the motor spring 105a in its extended position. From this position of zero displacement a clockwise or anticlockwise turning moment applied to the trunnion 97 will compress motor spring 105a either through spring guide 106 or 107 gradually increasing the biasing force of motor spring 105a to its maximum value equivalent to maximum motor displacement either in its forward or reverse direction of rotation.

The annular position of the trunnion 97 and therefor output torque and output speed of the motor are regulated by the reaction piston 117 acting against biasing force of motor spring 105a. As indicated above the timing port 91 is the high pressure port and timing port 92 is the low pressure port which can be maintained at a comparatively low pressure level of say 100 p.s.i. The space enclosed by the motor housing is connected through a port not shown to the reservoir 78 of FIG. 2 and therefore is maintained at approximately atmospheric pressure. The existing pressure differential between the low pressure motor timing port 92 and inside of the motor housing is utilized in this embodiment to provide the actuation force to reaction piston 117 and therefore to control the angular position of the trunnion 97. (It should be noted that the actuation forces of the reaction piston 117 could be derived from the high pressure fluid connected to the timing port 91.). The low pressure fluid at a selected level is supplied from the low pressure timing port 92 through passages 90a and 135 to space 128 and reacts against differential area of the first head section 124 of reaction piston 117. Since the space 127 on the opposite side of first head section 124 is connected through passage 146, annular ring 144, annular space 143 and passage 145 to the atmospheric pressure zone within the motor housing, a force equivalent to product of the low pressure of timing port 92 and differential area of the first head section 124 is transmitted to reaction piston 117. This force will tend to maintain the trunion 97 at its maximum angular inclination with stop 100 engaging surface 102. The differential area of first head section 124 is so selected that resulting force will be capable of fully compressing the motor spring 105a and maintaining it in its compressed position as shown in FIG. 3. The low pressure fluid is conducted from low pressure timing port 92 through passage 90a, restriction orifice 132 and passage 90 to low pressure motor port 56. A pressure loss or drop, proportional to flow, will occur between passages 90a and 90 due to the throttling of the fluid in the restriction orifice 132. Therefore the passage 90a during motor operation will always be at a higher pressure level than the passage 90, the difference between those two pressures being proportional to volume flow of the fluid through the restriction orifice 132. The passage 90a is connected through passage 134 to space 130 and the passage 90 is connected through passage 133 to space 131. The spaces 130 and 131 are located on the opposite sides of second head section 125 of reaction piston 117. The existing pressure differential of fluid contained in spaces 131 and 130 reacting on the effective area of the head section 125 will induce a force in the reaction piston 117 opposing the force generated on first head section 124 and proportional to the volume flow of the pressure fluid passing through the motor. The effective area of the first head section 124 and the low pressure level in the timing port 92 are so selected that the resulting force will maintain the motor spring 105a in its fully compressed position while at the same time sustaining the opposing force generated on second head section 125 which is proportional to specific fluid flow through the fluid motor. In this condition the motor trunion 97 will still be maintained in position of maxmum angular inclination. The clockwise moment developed on trunnion 97 by the force generated at the first head section 124 being completely balanced by clockwise moments of motor spring 105a and force generated on second head section 125. Any increase in the flow of fluid through the motor will increase the clockwise moment generated on the second head section 125 and against the variable bias of the motor spring 105a to turn the trunnion 97 in a clockwise direction towards position of new moment equilibrium and reduced angular inclination of the reaction surface 96 and therefore to a postion of reduced motor displacement. Therefore any increase in the fluid flow passing through the motor beyond that equivalent to moment equilibrium will proportionally reduce the motor displacement reducing its torque output and increasing its rotational speed. A motor equipped with this control will maintain its maximum displacement up to a given flow level. In this zone of operation the rotational speed of the output shaft 103 will be directly proportional to flow, the motor displacement remaining constant. Any increase in flow above the given level will reduce the motor displacement increasing the rotational speed of the motor shaft at a much higher rate. Once the effective areas of first and second head sections 124 and 125 and the preload in the motor spring 105a are established the actual point in respect to flow at which motor control will become active can be regulated either by selection of the low pressure level in the timing port 92 which is determined by setting of the relief valve 88 of FIG. 2 or by resistance characteristics of restriction orifice 132. The restriction orifice 132 can be made adjustable as shown in FIG. 3A in which rotation of restriction plug 132a will regulate the resistance characteristics of the restriction orifice 132.

The motor reversing valve 136 operable by the solenoid 148 is shown in FIG. 3 with the spool 137 positioned to divide the flow passages as described above. When actuated by solenoid 148 the spool 137 will move from right to left. Land 140 then isolates space 127 from atmospheric pressure and connects it through passage 147, annular space 142, annular ring 144 and passage 146 to the low pressure timing port 92. The cross-section area of the first stem section 121 is selected sufficiently smaller than the cross-section area of the second stem section 122 so a force generated on the first head section 124 will rotate the trunnion 97 in a clockwise direction into the zone of reverse motor rotation until the trunnion stop 101 will touch surface 102. FIG. 4 shows the motor of FIG. 3 working in its reverse zone of rotation. In the reverse zone of rotation the forces generated on the first and second head section are working in the same direction and the motor control mechanism becomes insensitive to flow variations therefore working as a fixed displacment motor. In applications of this motor to traction drives the variable feature is normally required only in the forward driving range which is much wider than the reverse driving range. However in case of requirement of variable feature both in forward and reverse driving range it will be obvious to those skilled in the art that passages 134 and 133 can be phased by additional lands on spool 137 into spaces 130 and 131 in such a way that on actuation of reversing valve 136 the upstream pressure of restriction orifice 132 can be connected to space 131 and downstream pressure connected to space 130. The above solution utilizing the well known principle of four way valve will permit the operation of the control both in forward and reverse driving ranges.

In general a fluid motor equipped with the above flow sensing control will permit extension of its useful range of speed operation far beyond the capabilities of any particular pump feeding the fluid motor.

The fluid motor shown in FIG. 5 basically performs in a way as described when referring to motor shown in FIG. 3 although the motor displacement is varied directly in response to the change in speed of rotation of the motor output shaft 163 instead of in response to change in the flow which is the case of motor in FIG. 3. Since under ideal conditions fluid flow into the motor is proportional to the motor shaft r.p.m. for any particular motor displacement the basic performance of the units of FIGS. 3 and 5 could be termed as equivalent. However, the motor control of FIG. 5 offers certain advantages. The displacement speed regulation of the motor of FIG. 3 although very precise will be affected to a small degree by leakage in the motor power elements and controls, the compressibility factor of the fluid, fluid density change in respect to temperature, and to some extent to changes in fluid viscosity. As indicated above the possible variations in controlled speed level due to those factors are very small. Nevertheless they do exist. In control of motor of FIG. 5 the speed of the output shaft is directly sensed by governor type speed sensing means which maintains a selected relationship between the speed of the motor shaft and motor displacement. The basic working components of the motor of FIG. 5, that is, trunnion, cylinder barrel valving method, motor spring assembly and solenoid operated reversing valve are identical to those of the motor of FIG. 3 and their functioning was already described in operation of motor of FIG. 3. The motor shaft 163, journalled in bearings 164 and 165 retained in the motor housing 158, is drivingly connected to the mechanical speed sensing device 217. The reaction housing 218 and inclined sliding plate 219 are slidably mounted in respect to each other by guiding pin 222 and biased towards each other by spring 221. Both the reaction housing 218 and inclined sliding plate 219 have conical inclined reaction surfaces with a multiplicity of balls therebetween. Since the speed sensing device revolves with the motor shaft the centrifugal force of the balls constrained by the conical surfaces will produce an axial force component along the axis of rotation of the governor directly opposing the biasing force of governor spring 221. This axial component of the centrifugal force will start to slide the the plate 219 axially when such force is great enough to overcome the preload of spring 221. Above this given force the displacement of the inclined sliding plate 219 will be a function of the motor speed and proportional to the motor r.p.m. This signal from the speed sensing device 217 in the form of axial movement of the plate 219 will be transmitted from the stem 225 to the plunger 226 and then through link 228 pivoted on to the pilot valve spool 194. In this way when the motor r.p.m. equivalent to preload in the spring 221 is reached any further increase in motor r.p.m. will move pilot valve spool 194 from right to left. The pilot valve spool 194 is slidably guided in pilot valve bore 193 located in reaction piston 178, which reaction piston through connecting rod 179 and pins 180 and 181 is connected to motor trunnion 157. The reaction piston 178 is equipped with first head section 185 functionally dividing bore 187 into spaces 188 and 189. The cross-section area of first stem section 182 is made substantially smaller than cross-section area of second stem section 183, thus, generating an effective force transmitted through connecting rod 179 as a clockwise movement to trunnion 157, this moment being of sufficient magnitude to compress motor spring 166 and maintain the trunnion stop 160 against the surface 162. As in motor of FIG. 3 space containing the cylinder barrel 154 is subjected to near atmospheric pressure and is connected through port, not shown, to system reservoir 78. The movement of the pilot valve spool 194 from right to left will connect space 192 with space 188 through passage 199, annular space 197, ring 198 and passage 200 and land 196 will isolate ring 198 from passage 202 connected to atmospheric pressure within the motor housing. It should be noted that space 188 is connected to low pressure timing port 151 through passage 214, space 210, passage 213, space 189, and passage 203. Since the space 191 is connected through passages 201 and 202 to atmospheric pressure a force will be generated on the effective area of second head section 186, the direction of this force being in opposition to the force generated on the first head section 185. This force generated on the head section 186 is of sufficient magnitude to provide the rotation of motor trunnion 157 in an anticlockwise direction which will reduce the motor displacement. The resulting movement of reaction piston 178 from right to left will cause the land 196 to isolate the space 192 from the timing port 151 thus terminating any further movement of reaction piston 178. In this way any axial movement of the inclined sliding plate 219 due to increased speed will be automatically translated through change of linkages already described and action of pilot valve spool 194 into proportional movement of reaction piston 178 and therefore proportional rotation of trunnion 157 in direction of the reduced motor displacement. From any equilibrium position a reduction in motor speed will result in movement of pilot valve spool 194 from left to right; the land 196 will move to provide communication of the space 192 to atmospheric pressure through passage 200, ring 198 and passage 202. Then the force generated on the second head section 186 becomes zero and therefore the force generated on first head section 185 will turn trunnion 157 in a clockwise direction thus increasing the motor displacement. The resulting motion of reaction piston 178 from left to right will isolate by land 196 the space 192 effectively stopping any further rotation of trunnion 157 when equilibrium has been established. In this way through the action of the speed sensing device 217, pilot valve spool 194 and reaction piston 178, the motor displacement in relation to motor shaft speed can be effectively regulated. Beyond a certain level of motor r.p.m. as defined by the preload in the governor spring 221 any further increase in the motor r.p.m. will effectively reduce the motor displacement and therefore effectively increase the potential speed range of the motor in respect to available fluid flow from the pump. In this way, beyond a certain speed level the motor displacement will be automatically regulated in respect to the motor r.p.m.

The reversing valve 204 when actuated by solenoid 216 will move spool 205 from left to right in a manner as previously described connecting space 188 to atmosphere and maintaining the space 189 connected to timing port 151. This will result in complete rotation in an anticlockwise direction of trunnion 157 to a point where stop 161 will engage surface 162 with fluid motor working in the zone of its reverse rotation. Since under those conditions space 188 and therefore annular space 197 are connected to atmosphere, the reaction piston 178 cannot act as an amplifier of the signal, the speed sensing control circuit becoming completely ineffective. In this way in its reverse zone of operation the fluid motor will act as a fixed displacement motor. It should be noted that for ease of adjustment of the governor control circuit, the preload in the governor spring 221 can be made adjustable.

With pressure in low pressure timing ports 92 and 151 of motors shown in FIGS. 3 and 5 dropped by pump unloading control to atmospheric level, the trunnions 97 and 157 under action of motor springs 105a and 166 will assume a position normal to the axis of rotation of the shaft 163 equivalent to zero displacement of the motors. Activation of pump by pump unloading control will automatically, in a manner as already described, activate the motor displacement controls. The unloading procedure of traction drive motors and bringing them into zero displacement position eliminates the necessity of clutches between motors and wheels of the tractor.

Referring back now to FIGS. 1 and 2 use of the motor of FIGS. 3 or 5 will give a very similar system performance. Assuming that motors of FIG. 5 are used in the tractor traction drive the high pressure fluid from high pressure timing port 37 is then transmitted through the high pressure flexible duct 25, ducts 51 and 52 to the high pressure ports 53 of fluid motors 19. The automatic pump control, within the maximum variable pump capacity, will supply flow to the high pressure ports 53 to maintain a constant fluid pressure at ports 53. At the same time the gear pump 73a will maintain the low pressure timing port 38 at a pressure as dictated by setting of the relief valve 88. Therefore the low pressure motor ports 56 will be automatically maintained at this pressure level. The above pressure at the motor ports 56 will bring the variable displacement mechanism of fluid motors into maximum displacement position and generate rotary motion in fluid motors. This rotation is transmitted through the gear reducers 18 to the wheels 17. The high pressure fluid, after performing work in driving of wheels 17, is exhausted from low pressure port 56 and through ducts 55, 54, and low pressure flexible duct 26, and is returned to low pressure timing port 38. With this arrangement, the speed of rotation of front wheels 17 is dictated by the surface speed of the tractor, which is driven by the rear wheels 15, connected through the mechanical transmission to the engine 12. When driving in the speed range up to the point of activation of the speed sensing device 217 and the motor speed control, driving torque developed by the fluid motors and transmitted to the steered wheels is directly proportional to the system pressure and therefore controlled by the preload in the valve spring 71. It should be noted that the motor speed at which the speed control becomes activated must occur before the maximum pump capacity is reached. Once the speed equivalent to the speed sensing device setting is reached the motor displacement will be gradually reduced by the motor controls. In this zone of operation the torque developed by the fluid motors and transmitted to the steered wheels becomes inversely proportional to the surface speed of the tractor. The gradual reduction in the motor displacement although reducing developed torque will extend the range of operation of the tractor into much higher speeds while utilizing the same maximum pump capacity. Under normal driving conditions both the rear wheels 15 and steered wheels 17 are functionally synchronized by the ground surface. Therefore, as long as the traction resistance wholly contains the torque developed at the steered wheels by the fluid motors, the higher the surface speed of the tractor, the higher the speed of rotation of the steered wheels 17 and within the range of operation of motor controls the lower the motor displacement. In the zone of operation of the fluid motor controls the motors will automatically reduce their displacement to maintain the fluid drive within the maximum capacity of the pump. Due to the automatic speed control of the motors some other very important benefits are obtained. In the arrangement as shown in FIG. 2 where two fluid motors are used those two motors form so-called hydraulic differential. As long as the steered wheels 17 are fully synchronized by traction resistance flow of fluid will be equally distributed to both motors. However because of the very well known characteristics of the differential action a sudden loss of traction at one of the front wheels would normally divert large flows of fluid to the unloaded wheel thus exceeding the pump capacity with associated loss of pressure and therefore traction potential. However, with the existence of the speed or flow control of this invention the increased speed of rotation of the unloaded wheel will be followed by corresponding decrease in the displacement of the motor driving the unloaded wheel. In this way the maximum pump capacity will not be reached, the pump under action of its automatic control still supplying the fluid at a constant pressure. Under those conditions the second steered wheel of the tractor will still maintain its full torque contribution to the traction drive system. In this way while maintaining all the beneficial aspects of the hydraulic differential principle its parasitic features of complete loss of power with loss of traction of one of the driving wheels are completely eliminated.

In tractor traction drive high speed application occurs only in forward driving range. When driving in reverse the maximum speeds reached are comparatively low. Therefore motor speed control was made to be active only in the forward driving range. The method of adaptation of the speed control of motors shown in FIG. 3 was generally discussed. The forward and reverse control for motor shown in FIG. 5 can be accomplished by use either of a composite governor or two opposed governors along the principles well known in the art.

In FIGS. 3 and 5 low system pressure was used for operation of the motor speed and flow controls. This was done to reduce the stress of the control parts and permit the use of wider clearances between the moving parts at comparatively low level of fluid leakage. However, those controls will work equally well where connected to the high pressure transmission branch. For some applications it may be preferable to introduce between high pressure motor port and motor flow speed control a proportional pressure reducing control of type as shown in the pump control 59 of FIG. 2, or of other conventional designs well known in the art. Such a proportional pressure reducing valve would permit better selection of speed control settings but it would obviously add cost to the motor.

Although, axial piston motors are shown in the preferred and disclosed embodiments, the control concept of this invention is adaptable to other types of positive displacement variable motors. For example, in case of a vane motor, the capacity is changed by changing the stator eccentricity. When adapting such a vane motor to the concept of this invention the principle of the movable trunnion would be substituted for the movable stator. The biasing and actuating elements of the control of this invention remaining essentially the same. Those skilled in the art will readily see how the concept of this invention can be applied to other types of positive displacement motors, and the advantages of the preferred embodiment in the disclosed hydraulic system for tractor drives.

Although several embodiments of this invention have been shown and described, various adaptations and modifications can be made without departing from the scope of the appended claims.

I claim:
1. A fluid motor comprising, shaft means, power generating means operatively connected to said shaft means and disposed to translate fluid power of pressure fluid to mechanical torque and rotation, means to vary the effective capacity of said fluid motor, speed sensitive control means operatively connected to said means to vary the capacity disposed to decrease the capacity with increasing speed and increase the capacity with decreasing speed independent of the system pressure.

2. The combination of claim 1 wherein the speed sensitive control means includes means operative responsive to the shaft speed.

3. The combination of claim 1 wherein the speed sensitive control means includes means operative responsive to fluid flow.

4. The combination of claim 1 characterized by said speed sensitive control means including biasing means normally urging said means to vary the motor capacity toward its position of minimum capacity and fluid pressure responsive actuating means opposing said biasing means urging the means to change the motor capacity toward its position of maximum capacity.

5. The combination of claim 4 wherein the biasing means includes a spring mounted to increase its biasing force when compressed.

6. A fluid motor comprising shaft means, power generating means operatively connected to said shaft means and disposed to translate fluid power of pressure fluid to mechanical torque and rotation, means to vary the torque capacity of said fluid motor from maximum in one direction of rotation of the shaft through a position of zero torque capacity to a maximum in the opposite direction of rotation of the shaft, speed sensitive control means operatively connected to said means to vary the capacity disposed to decrease the capacity with increasing speed and increase the capacity with decreasing speed in one direction of rotation of the motor shaft.

7. The combination of claim 6 wherein the speed sensitive control means includes means responsive to the shaft speed.

8. The combination of claim 6 wherein the speed sensitive control means includes means responsive to fluid flow.

9. A fluid motor comprising, housing means, shaft means, power generating means disposed in said housing means operatively connected to said shaft means and disposed to translate fluid power of pressure fluid to mechanical torque and rotation, means to vary the torque capacity of said fluid motor from a maximum in one direction of rotation of the shaft through a position of zero torque capacity to a maximum in the opposite direction of rotation of the shaft, speed sensitive control means operatively connected to said means to vary the capacity disposed to decrease the capacity with increasing speed and increase the capacity with decreasing speed in at least one direction of rotation, said speed sensitive control means including biasing means disposed to urge the means to vary the capacity toward the position of zero displacement on either side of the zero displacement, and fluid pressure responsive actuating means opposing said biasing means to selectively urge the means to change the capacity toward its maximum position on either side of zero capacity.

10. The combination of claim 9 further characterized by said biasing means including spring biasing means, and means to contain the reaction forces of said spring biasing means by said housing means in respect to the means to vary the capacity when said motor capacity becomes zero.

11. The combination of claim 10 wherein said spring biasing means includes an assembly of a spring disposed between a pair of spring retainers, said assembly being mounted for limited slideable movement with respect to said housing.

12. The combination of claim 9 wherein said fluid pressure responsive actuating means includes means to generate force selectively in first and second opposite directions.

13. A fluid motor comprising, shaft means, power generating means operatively connected to said shaft means and disposed to translate fluid power of pressure fluid to mechanical torque and rotation, means to vary the effective capacity of said fluid motor, speed sensitive control means including spring biasing means normally urging said means to vary the capacity of the motor to its position of minimum capacity, fluid pressure responsive first actuating means opposing said spring biasing means and arranged to urge said means to change the capacity of the motor toward its position of maximum capacity, and fluid flow responsive second actuating means responsive to the flow of fluid supplied to the motor opposing said first actuating means and arranged to urge said means to change the capacity of the motor toward its position of minimum capacity, whereby an increase in fluid flow passing through the motor will reduce torque capacity of said motor.

14. The combination of claim 13 characterized by said second actuating means including means to translate fluid flow to a fluid pressure signal.

15. The combination of claim 14 characterized by said means to translate fluid flow to a pressure signal including fluid flow restricting means.

16. A variable displacement fluid motor comprising, a housing having inlet and outlet ports, a cylinder barrel journalled for rotation in said housing, shaft means operable by said cylinder barrel, said cylinder barrel having cylindre bores and pistons mounted in said cylinder bores for reciprocation therein, valving means disposed to phase pressure fluid from said inlet port to said cylinder bores and to said outlet port, a cam plate disposed to operate against said pistons, means mounting said cam plate to change the angle thereof with respect to the axis of rotation of the cylinder barrel to change the torque capacity of the motor, said cam plate being movable from a position normal to the axis of rotation to a maximum angle in one direction with respect to the axis of rotation and a maximum angle in the opposite direction with respect to the axis of rotation, and speed sensitive control means including spring biasing means disposed to urge said cam plate toward its position normal to the axis of rotation of the cylinder barrel, fluid pressure responsive first actuating means disposed to generate a force opposing said biasing means to urge the cam plate selectively to its maximum position in either of said directions, and fluid flow responsive second actuating means arranged to opposed said first actuating means responsive to the flow of fluid supplied to the motor in at least one of said directions of urging thereof, whereby an increase in fluid flow passing through the motor will reduce torque capacity of said motor.

17. The combination of claim 16 characterized by said second actuating means including means to translate fluid flow to a pressure signal.

18. The combination of claim 17 wherein said said means to translate fluid flow to a pressure signal includes fluid flow restricting means, and means to sense the pressure drop thereacross.

19. The combination of claim 18 further characterized by said means to translate fluid flow to a pressure signal including piston means operably connected to said cam plate means and operable by the means to sense the pressure drop across the fluid flow restricting means.

20. The combination of claim 18 further characterized by means to adjust said fluid flow restricting means.

21. A fluid motor comprising, shaft means, power generating means operatively connected to said shaft means disposed to translate fluid power of pressure fluid to mechanical torque and rotation, means to vary the effective capacity of said fluid motor, speed sensitive control means including spring biasing means normally urging said means to vary the capacity of the motor to its position of minimum capacity, first actuating means opposing said spring biasing means and arranged to urge said means to change the capacity of the motor toward its position of maximum capacity, speed sensing means disposed to sense the rotational speed of said shaft and arranged to urge said means to change the capacity of the motor toward position of minimum capacity responsive to the sensed speed independent of system pressure, whereby an increase in the rotational speed of said shaft means will reduce the torque capacity of the motor.

22. The combination of claim 21 wherein said speed sensing means includes means to translate the rotational speed of said shaft into proportional mechanical movement.

23. The combination of claim 22 wherein said means to translate the rotational speed of said shaft into proportional mechanical movement includes a governor type means and means operable by said governor type means to amplify said signal from said governor means and apply said amplified signal to said means to change the capacity of the motor.

24. The combination of claim 21 wherein said speed sensing means includes ball and plate means.

25. The combination of claim 24 wherein said ball and plate means is operable against spring biasing means.

26. The combination of claim 21 wherein said first actuating means is fluid pressure actuated.

27. A fluid motor comprising, shaft means, power generating means operatively connected to said shaft means disposed to translate fluid power of pressure fluid to mechanical torque and rotation, means to vary the effective capacity of said fluid motor, speed sensitive control means including spring biasing means normally urging said means to vary the capacity of the motor to its position of minimum capacity, fluid operated first actuating means opposing said spring biasing means and arranged to urge said means to change the capacity of the motor toward its position of maximum capacity, speed sensing means disposed to sense the rotational speed of said shaft mean, and second fluid operated actuating means responsive to said speed sensing means arranged to urge said means to change the capacity of the motor toward position of minimum capacity whereby an increase in the rotational speed of said shaft means will reduce the torque capacity of the motor.

28. A variable displacement fluid motor comprising, a housing having inlet and outlet ports, a cylinder barrel journalled for rotation in said housing, shaft means operable by said cylinder barrel, said cylinder barrel having cylinder bores and pistons mounted in said cylinder bores for reciprocation therein, valving means disposed to phase pressure fluid from said inlet port to said cylinder bores and to said outlet port, a cam plate disposed to operate against said pistons, means mounting said cam plate to change the angle thereof with respect to the axis of rotation of the cylinder barrel to change the torque capacity of the motor, said cam plate being movable from a position normal to the axis of rotation to a maximum angle in one direction with respect to the axis of rotation and a maximum angle in the opposite direction with respect to the axis of rotation, and speed sensitive control means including spring biasing means disposed to urge said cam plate toward its position normal to the axis of rotation of cylinder barrel, fluid pressure responsive first actuating means disposed to generate a force opposing said spring biasing means and arranged to urge the cam plate selectively to its maximum position in either of said directions, and shaft speed responsive second actuating means arranged to oppose said first actuating means in at least one of said directions of urging thereof.

29. The combination of claim 28 wherein said speed sensing means includes means to translate the rotational speed of said shaft into proportional mechanical movement.

30. The combination of claim 29 wherein said means to translate the rotational speed of said shaft into proportional mechanical movement includes a governor type means and means operable by said governor type means to amplify said signal from said governor means and apply said amplified signal to said means to change the capacity of the motor.

31. The combination of claim 28 further characterized by said shaft speed responsive means including ball and plate means movable against a spring bias.

32. The combination of claim 31 further characterized by means to translate movement of said plate means to a fluid pressure signal.

33. In a self-propelled vehicle having a frame, an engine and first and second sets of wheels mounted on said frame, driving means interposed between said engine and said first set of wheels, the combination therewith of a fluid power transmission and control system interposed between said engine and said second set of wheels comprising, a fluid pump, said pump having flow changing means and means to operate said flow changing means to maintain a substantially constant fluid discharge pressure within the maximum capacity of the flow changing means, at least one fluid motor drivingly connected to said second set of wheels, each of said fluid motors having fluid ports operably connected to said pump, each of said motors having displacement changing means, and speed sensitive control means to operate said displacement changing means to change displacement of said motor in response to speed change.

34. The combination of claim 33 wherein said speed sensitive control means of each motor is operable in response to the fluid flow therein.

35. The combination of claim 34 wherein said speed responsive control means of each motor is operable by the speed of its respective wheel.

36. In a self-propelled vehicle having a frame, an engine and first and second sets of wheels mounted on said frame, driving means interposed between said engine and said first set of wheels, the combination therewith of a fluid power transmission and control system interposed between said engine and said second set of wheels comprising, a fluid pump, said pump having flow changing means and means to operate said flow changing means to maintain a substantially constant fluid discharge pressure within the maximum capacity of the flow changing means, at least one fluid motor drivingly connected to said second set of wheels, each of said fluid motors having fluid ports operably connected to said pump, each of said motors having displacement changing means, and speed sensitive control means to operate said displacement changing means to change displacement of said motor in response to speed change of said motor, said displacement changing means of said motors including biasing means normally urging the displacement changing means to its position of minimum displacement.

37. In a self-propelled vehicle having a frame, and engine and driving wheels mounted on said frame, driving means interposed between said engine and said driving wheels, steered wheels pivotally mounted on said frame, the combination therewith of a fluid power transmission and control system disposed to power said steered wheels comprising, fluid motor means mounted on said steered wheels and drivingly engaged therewith, said fluid motor means having first and second fluid ports, means to vary the torque capacity of said motor means, speed sensitive control means disposed to operate said means to change the torque capacity of said motor means, said speed sensitive control means including biasing means normally urging said means to vary the torque capacity toward a position of minimum capacity and fluid pressure responsive actuating means opposing said biasing means urging the means to change the torque capacity of the motor toward a position of maximum capacity, a variable flow pump carried by said vehicle, said pump having inlet and outlet ports, duct means between said pump ports and said ports of the fluid motor means, said pump having flow changing means and means to operate said flow changing means to maintain a relatively constant fluid discharge pressure therefrom.

38. The combination of claim 37 wherein the speed sensitive control means of each motor means is operable in response to fluid flow therein.

39. The combination of claim 37 wherein the speed sensitive control means of each motor means is operable in response to its respective wheel speed.

40. The combination of claim 37 further characterized by means to vary the responsive level of said speed sensitive control means.

41. The combination of claim 37 furthercharacterized by said pump including means to selectively vary the discharge pressure therefrom.

42. The combination of claim 37 wherein each of said fluid motors are axial piston motors and the means to vary the torque capacity thereof includes tiltable cam plate means.

43. The combination of claim 42 wherein said cam plate means are tiltable on both sides of a plane normal to the axis of rotation of the motor whereby the motor can operate in forward and reverse directions.

44. The combination of claim 43 wherein said speed sensitive control means is operative only in the forward direction of said motors.

45. The combination of claim 37 further characterized by means to selectively unload said pump.

46. In a self-propelled vehicle having a frame mounting an engine and a multiplicity of driving wheels and steered wheels, driving means between said engine and said driving wheels, the combination therewith of a fluid power transmission and control system interposed between said engine and said steered wheels comprising, variable capacity fluid motor drivingly engaged with each of said steered wheels, a variable flow fluid pump having control means to automatically vary its flow to maintain a constant output pressure, duct means functionally interconnecting said variable displacement fluid pump and said variable capacity fluid motors to form a fluid differential drive system and speed responsive control means arranged to individually reduce the capacity of said motors rsponsive to an increase in rotational speed of said motors, whereby said fluid differential drive system will not be unloaded with loss of traction at any of said steered wheels.

47. In a self-propelled vehicle having a frame, an engine and driving wheels mounted on said frame, driving means interposed between said engine and said driving wheels, a multiplicity of steered wheels pivotally mounted on said frame, the combination therewith of a fluid power transmission and control system interposed between said engine and said steered wheels, variable capacity fluid motor means mounted on each of said steered wheels and drivingly engaged therewith, said variable capacity fluid motor means each having first and second fluid ports, a variable flow pump having inlet and outlet ports, said variable flow pump having control means disposed to automatically vary its flow to maintain a constant pressure at its outlet port, first duct means connecting said outlet port of said pump to each of said first ports of said fluid motor means to form a fluid differential drive system, second duct means functionally interconnecting said inlet port of said pump with each of said second ports of said fluid motor means, and speed responsive control means positioned and disposed to reduce individually in the capacity of said variable motor means responsive to an increase in rotational speed of said variable motor means, whereby said fluid differential drive system will not be unloaded with loss of traction at any of said steered wheels.

References Cited

UNITED STATES PATENTS

| | | | |
|---|---|---|---|
| 2,409,185 | 10/1946 | Blasutta | 91—199 |
| 2,598,538 | 5/1952 | Haynes | 180—66 X |
| 2,667,862 | 2/1954 | Muller | 91—199 |
| 2,731,569 | 1/1956 | Cardillo et al. | 60—53 X |
| 2,768,636 | 10/1956 | Postel et al. | 60—53 X |
| 3,053,043 | 9/1962 | Knowler | 180—66 X |
| 3,063,381 | 11/1962 | Budzich | 103—38 X |
| 3,138,067 | 6/1964 | Cadiou | 91—199 X |
| 3,209,538 | 10/1965 | Kuze | 60—53 |

FOREIGN PATENTS

| | | |
|---|---|---|
| 576,420 | 4/1946 | Great Britain. |
| 791,903 | 3/1958 | Great Britain. |

BENJAMIN HERSH, *Primary Examiner.*

MILTON L. SMITH, *Examiner.*